United States Patent [19]

Hellwig

[11] 4,345,749

[45] Aug. 24, 1982

[54] MULTIPURPOSE SPLINT MEANS FOR SPRING LEAF ASSEMBLIES

[75] Inventor: Donald J. Hellwig, Exeter, Calif.

[73] Assignee: Hellwig Products Company, Inc., Visalia, Calif.

[21] Appl. No.: 172,984

[22] Filed: Jul. 28, 1980

[51] Int. Cl.³ ............................................. F16F 1/26
[52] U.S. Cl. .................................................. 267/51
[58] Field of Search ....................... 267/48, 51, 53, 55

[56] References Cited

U.S. PATENT DOCUMENTS

| | | | |
|---|---|---|---|
| 1,053,241 | 2/1913 | Talor | 267/51 |
| 1,144,945 | 6/1915 | Ouimette | 267/51 |
| 1,172,499 | 2/1916 | Stenzel | 267/51 |
| 1,179,888 | 4/1916 | Badlat | 267/51 |
| 1,766,924 | 6/1930 | Moorhouse | 267/51 |

Primary Examiner—Duane A. Reger
Attorney, Agent, or Firm—Poms, Smith, Lande & Rose

[57] ABSTRACT

A multipurpose splint means for at least temporary repair of a broken leaf element of a spring leaf assembly, the splint means comprising an elongated arcuate spring steel member having a convex surface intermediate ends thereof adapted to be juxtaposed to a fracture in a broken leaf element, spaced bolt positioning means formed in the member at opposite ends of the convex surface for receiving and positioning securement members to attach the splint member to the assembly, the central portion of the convex surface lying exteriorly of a plane tangent to surface portions of the positioning means whereby the convex surface is adapted to realign and retain the broken ends of the broken leaf element. The elongated arcuate splint member is also provided with an end portion extending beyond one of the bolt positioning means, the end portion being upturned at a selected radius to cradle the eye formed at the end of a main spring leaf element in the event fracture occurs adjacent to the eye.

1 Claim, 6 Drawing Figures

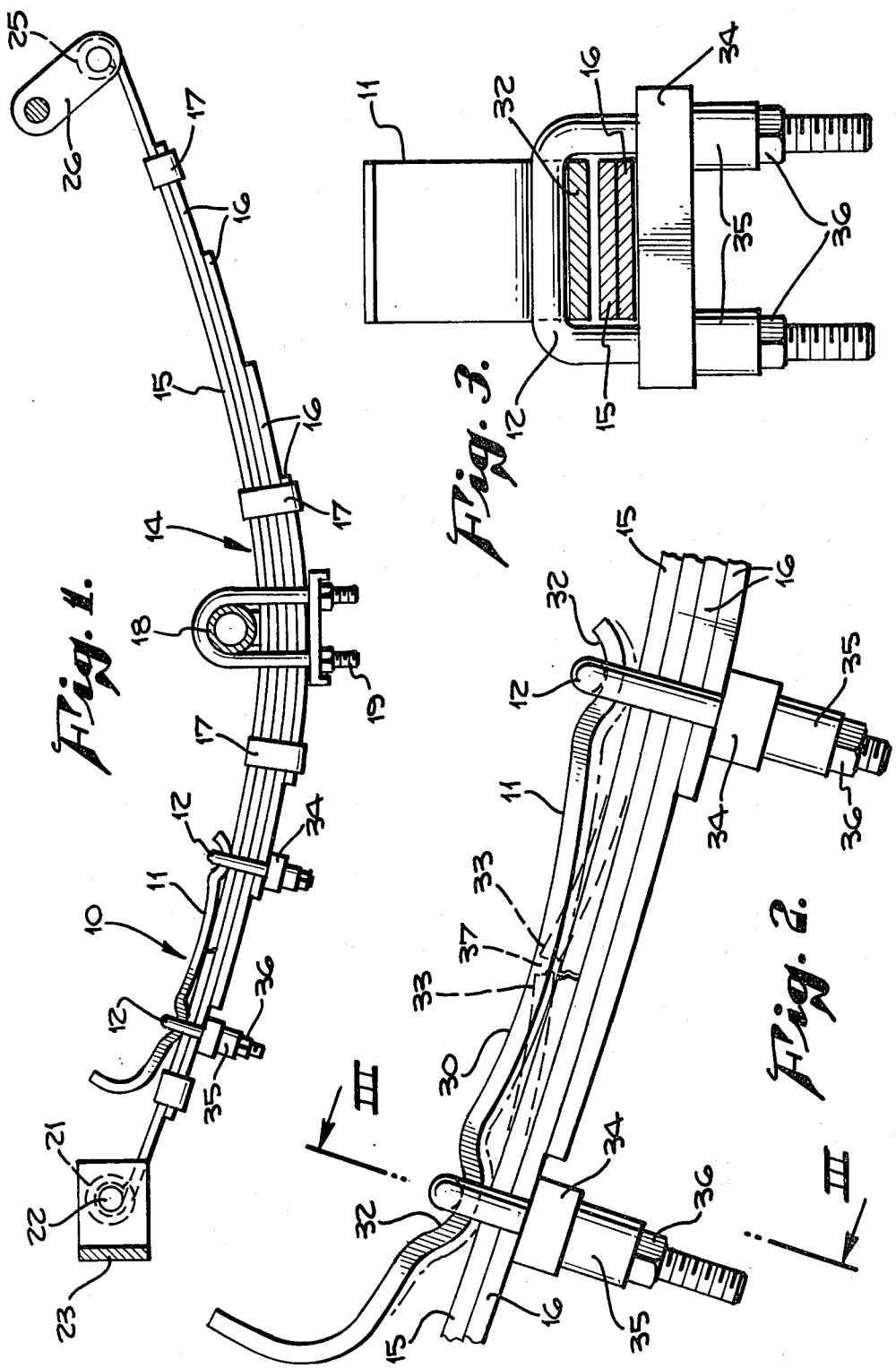

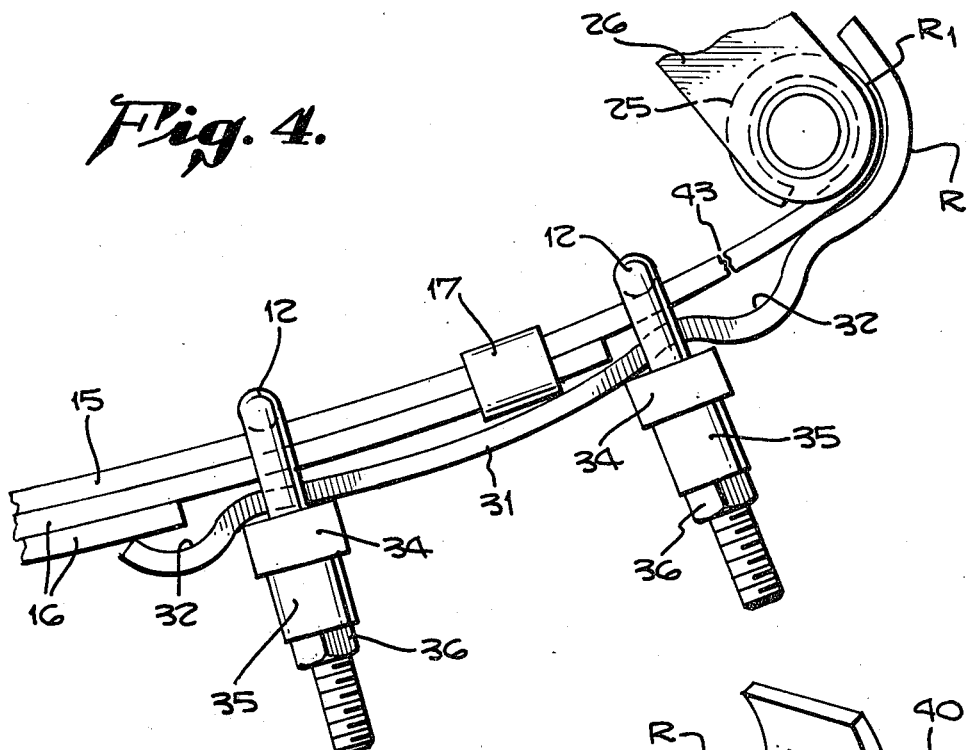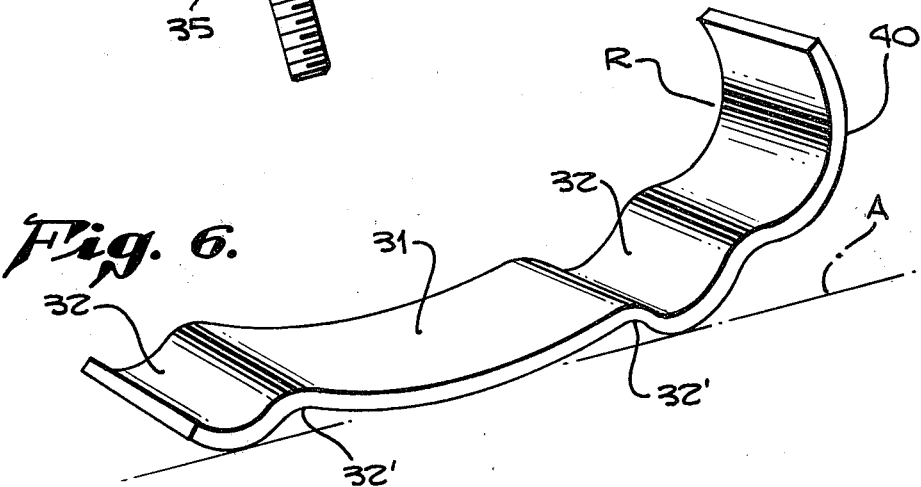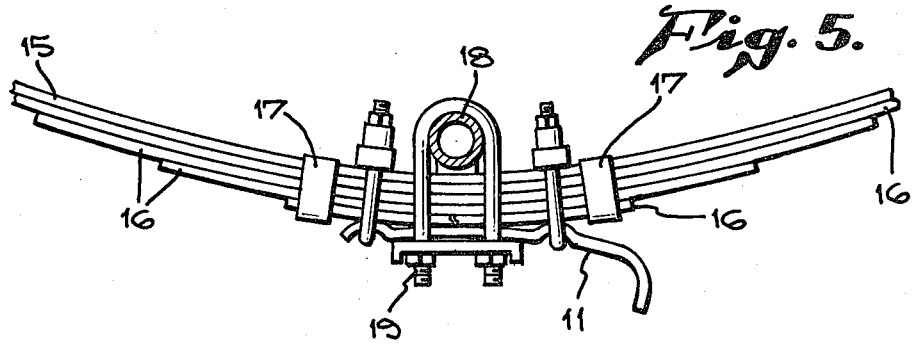

MULTIPURPOSE SPLINT MEANS FOR SPRING LEAF ASSEMBLIES

BACKGROUND OF THE INVENTION

Spring leaf assemblies comprising two or more spring leaves of different length are extensively used in vehicle suspensions. The number, size, and length of the leaf elements comprising a spring leaf assembly are determined by the load capacity of the associated vehicle. Such spring leaf assemblies are selectively positioned with respect to the axle of the vehicle to maintain proper alignment and operation. One or more leaves of a spring leaf assembly may break or fracture for various causes such as metal fatigue, overloading of the vehicle, impacts or shocks to the leaf assembly when the vehicle strikes a bump or hole in the road, and a combination of these causes and other causes. Off road type vehicles are particularly subject to unusual stress and shock forces because of the rough irregular terrain over which such vehicles are driven.

When a vehicle has a broken spring element adjacent the permanent or fixed shackle end of the spring, the vehicle axle may shift and cause locking of the emergency brake. Also, such shifting of the axle may cause the drive shaft to disengage the driving spline. If this occurs, the vehicle is immobolized.

SUMMARY OF THE INVENTION

The present invention relates to a novel multipurpose splint means for temporary field repair of leaf spring assemblies used on vehicles. The invention contemplates a splint means, comprising a specially configured splint member and securement means therefor which may be readily installed in field to enable the vehicle to be driven to a repair facility.

The primary object of the invention, therefore, is to provide a splint member of novel configuration and adapted to be used in the temporary repair of fractures of a leaf spring assembly which may occur at different locations in the assembly.

An object of the invention is to provide a splint means for a spring leaf assembly in which the splint means repositions and realigns adjacent fractured portions of a fractured spring leaf.

Another object of the invention is to provide a splint means for repair of a broken leaf spring element wherein a fracture adjacent the eye of a main leaf spring is readily temporarily repaired by supporting the spring eye in a cradle on a splint member of this invention.

Another object of the present invention is to provide a splint member of spring steel and having a length and width readily adaptable to leaf assemblies or different size, length, and number of leaves.

A further object of the present invention is to provide a splint member so configured that the member may be utilized in different positions and secured to the leaf assembly at different locations along the leaf assembly.

The invention particularly contemplates a mutlipurpose splint means for repair of a leaf spring assembly in which an elongated spring steel member has an arcuate shape to provide a convex surface portion adapted to be juxtaposed opposite a spring fracture of one location, the convex face extending laterally beyond a plane tangent to corresponding faces of positioning means provided at opposite ends of the convex portion whereby tightening the positioning means bends and stresses the splint member opposite to its normal curvature and presses against the broken leaf element to hold said broken leaf element in its approximate normal position. The fractured leaf element with a splint member so secured and stressed is thus able to function with the assistance of the splint member to permit travel of the vehicle.

Various other objects and advantages of the present invention will readily apparent from the following description of the drawings in which several uses of the splint means are illustrated.

IN THE DRAWINGS

FIG. 1 is a side elevational view of a spring leaf assembly having a broken leaf element and showing the multipurpose splint means of this invention in operative installed position.

FIG. 2 is an enlarged fragmentary elevational view of the splint means and portion of the spring leaf assembly shown in FIG. 1, the view showing in dotted lines an exemplary position of fractured portions of a spring leaf prior to application of the splint means, and showing in phantom lines the position of the splint means of this invention in operative repair position.

FIG. 3 is a sectional view taken in the transverse plane indicated by line III—III of FIG. 2.

FIG. 4 is an enlarged fragmentary end view of the splint means of this invention employed to repair a fracture at the end of a main leaf spring and to illustrate cradling of the eye of the end of the main leaf spring.

FIG. 5 is a side elevational view of the application of the splint means of this invention at a central portion of a spring leaf assembly.

FIG. 6 is a perspective view of the splint member of this invention.

In FIG. 1 a multipurpose splint means embodying this invention is generally indicated at 10 and includes a splint member 11 and a pair of securement members 12. Splint means 10 is shown as applied to a spring leaf assembly 14 of known form and manufacture.

Leaf assembly 14 includes a plurality of stacked leaf members including a main leaf member 15 and one or more leaf members 16 of progressively shorter length held in assembly by longitudinally spaced securement bands 17. Leaf assembly 14 is positioned in well-known manner with respect to axle 18 and secured in such positioned by U bolt assemblies 19 in well-known manner. One end of main spring leaf 15 is provided with an eye 21 which receives a fixed bolt 22 carried by a bracket 23 on the frame or chassis of a vehicle. The other end of main leaf spring 15 is provided with an eye 25 supported by a shackle bolt assembly 26 in well-known manner.

Referring to FIG. 6, splint member 11 comprises an elongated arcuate member of spring steel stock configured to serve as a splint means for realigning and repositioning broken leaf spring elements of the leaf assembly 14 and also to cradle the end eye portion of a main leaf spring fractured adjacent to its end. Member 11 is of uniform width and approximately the width of the spring leaf elements of the spring assembly. Widths of such leaf elements may vary for different assemblies. However, the width of splint member 11 may be utilized with substantially all widths of leaf elements. An exemplary splint member may be 2 inches wide, 11 to 12 inches long, and ¼ inch thick.

Splint member 11 is of uniform cross sectional area throughout its length and is formed with an arcuate intermediate portion 30 providing a convex surface 31 on one side thereof. Integral with the intermediate portion 30 are spaced transverse recesses or depressions 32 which serve as positioning means for securement members 12. In normal unstressed condition, the central portion of convex surface 31 lies exteriorly of or beyond a plane A tangent to the exterior or bottom surfaces (as viewed in FIG. 6) of the formed recesses 32 for contact of the central portion of the convex surface 31 with margins 33 of the fractured leaf element at the fracture as indicated in FIG. 2.

When securement members 12, which may comprise U bolts with crossbars 34, spacers 35 and tightening nuts 36 are assembled with the splint member 11 on opposite sides of a fracture at 37, are tightened, the meber 11 presses the fracture margins 33 into substantial alignment. The securement members 12 are tightened until the exterior faces of the recess portions 32 are brought into contact with the top surface of leaf 15 so that the broken leaf element is substantially realigned to its normal position and is tightly held in stressed frictional engagment with the adjacent leaf 16. The stressed convex portion 30 of the splint member reacts to flexing of the leaf assembly in the manner of a spring leaf portion and permits the entire leaf assembly to operatively function.

Referring again to FIG. 6, splint member 11 is provided with an end porton 40 which extends beyond the adjacent recess portion 32 and curves upwardly at approximately 90° about a radius R sufficient to accept and receive in the upturned end portion 40 the outer radius $R_1$ of the eye 25 of a main spring leaf 15.

As shown in FIG. 4, when a fracture adjacent the end of the main spring leaf 15 occurs at 43, the splint member 11 may be turned over from its position as shown in FIG. 1 so that the upturned end portion 40 may cradle the end eye of the main leaf 15. The reverse indentations 32' provided at ends of convex surface 31 and the shaping of the recesses 32 serve to position crossbars 34 of securement members 12 so that splint member 11 is securely held in assembly with the leaf assembly. The U bolt securement members adjust themselves readily by length of threads or spacers to the number of leaf elements embraced by the U bolt so that, as shown in FIG. 4, the cradle 40 provides a spring steel extension of the leaf assembly.

In FIG. 5 a further example of the utility of the splint member of this invention is illustrated. In this example, the splint member 11 is employed at a central position of the leaf assembly, below the axle 18, the spring member being applied to the short bottom leaf 16 of the leaf assembly in a manner similar to that shown in FIG. 1.

It will be understood that the leaf assembly 14 is exemplary only and that spring leaf arrangements having different spring capacities and two or more leaves may be employed on a vehicle. It is contemplated that the splint means of this invention will be useful on and be adapted to spring leaf assemblies for trailers and various types of vehicles ranging from off-road vehicles to passenger vehicles.

Adaptation of splint member 11 to such different capacity leaf spring assembly normally does not require a change in size of splint member 11. To facilitate installation, securement members 12 are provided with spacers 35 of different length or long threaded portions so they may be installed at thick spring leaf assembly portions (FIG. 5) or at thin portions (as at right of FIG. 4). The width of a U-bolt is preferably great enough to receive the width of the spring leafs (as in FIG. 3). However, U-bolt width may be greater for installations in which the spring leaves are wider or narrower than the splint member. In such cases relative lateral play between the splint member and the adjacent spring leaf is resisted by the tight frictional engagement of the member and leaf.

It will be understood that repair of a broken spring leaf with the splint member of this invention is readily accomplished by raising the vehicle frame with a jack to relieve the vehicle load on the spring suspension. The spring and axle may then be repositioned, if necessary. The splint member 11 is applied to the fracture as described above and the securement bolts and nuts tightened by a wrench until the splint member contacts the fractured leaf element in three places as shown in FIG. 3.

Various modifications and changes may be made in the splint means described above and all such changes and modifications coming within the scope of the appended claims are embraced thereby.

I claim:

1. A multipurpose splint means for at least temporary repair of a broken leaf element of a spring leaf assembly, comprising:

an elongated flexible generally arcuate member of spring steel having correspondingly curved opposite elongate surfaces;

said arcuate member including an intermediate portion of selected length, an end portion providing a transverse recess means, a corresponding transverse recess means at the opposite end of the intermediate portion, said recess means being curved in the same direction and adapted to provide positioning means for securement members in one application of the arcuate member to a leaf spring assembly, an opposite end portion integral with said recess means at the opposite end of the intermediate portion and curving through a radius of about 90° and adapted to cradle an end eye of a main spring leaf in another application of the arcuate member to a leaf spring assembly, said recess means, intermediate portion, and said opposite end portion providing on one elongate surface spaced convex faces, the convex face of the intermediate portion including a central face portion lying exteriorly beyond a plane tangent to the convex faces of the contiguous recess means, said convex faces of the recess means and intermediate portion forming spaced concave indentations adapted to position securement members in said another application of the arcuate member to a leaf spring assembly.

* * * * *